Figure 6:
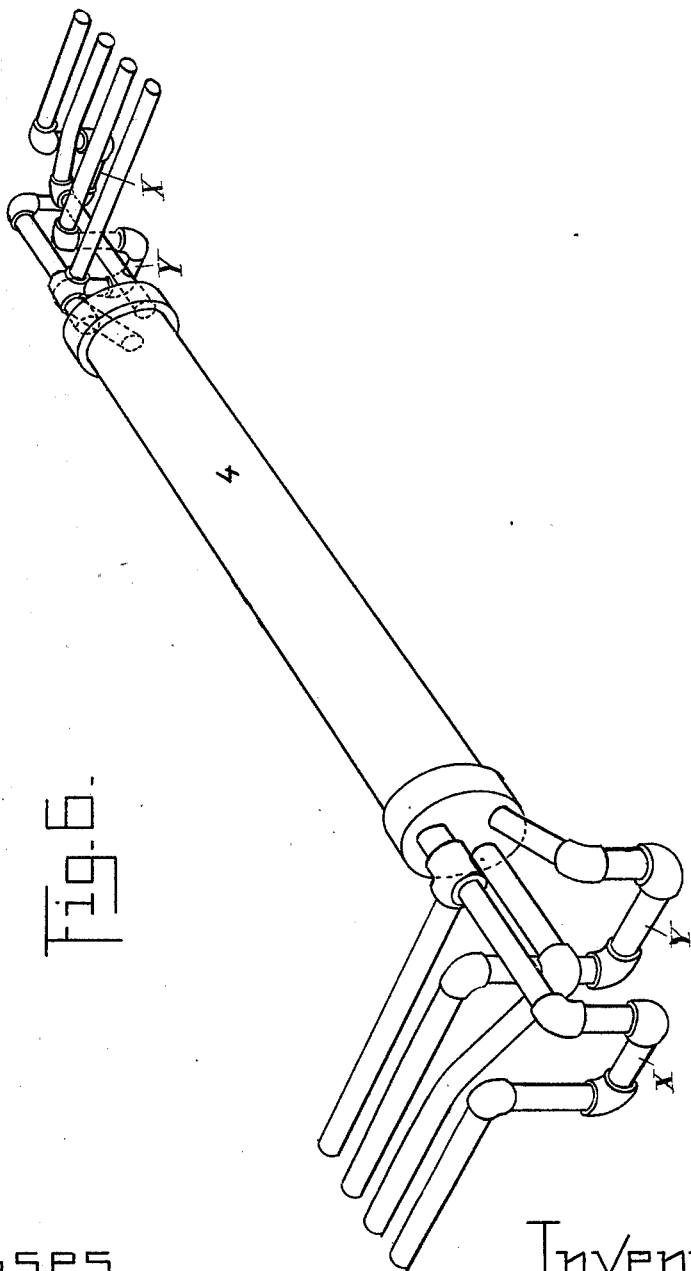

No. 672,509. Patented Apr. 23, 1901.
J. F. McELROY.
HEATING APPARATUS.
(Application filed July 8, 1895.)
(No Model.) 4 Sheets—Sheet 1.
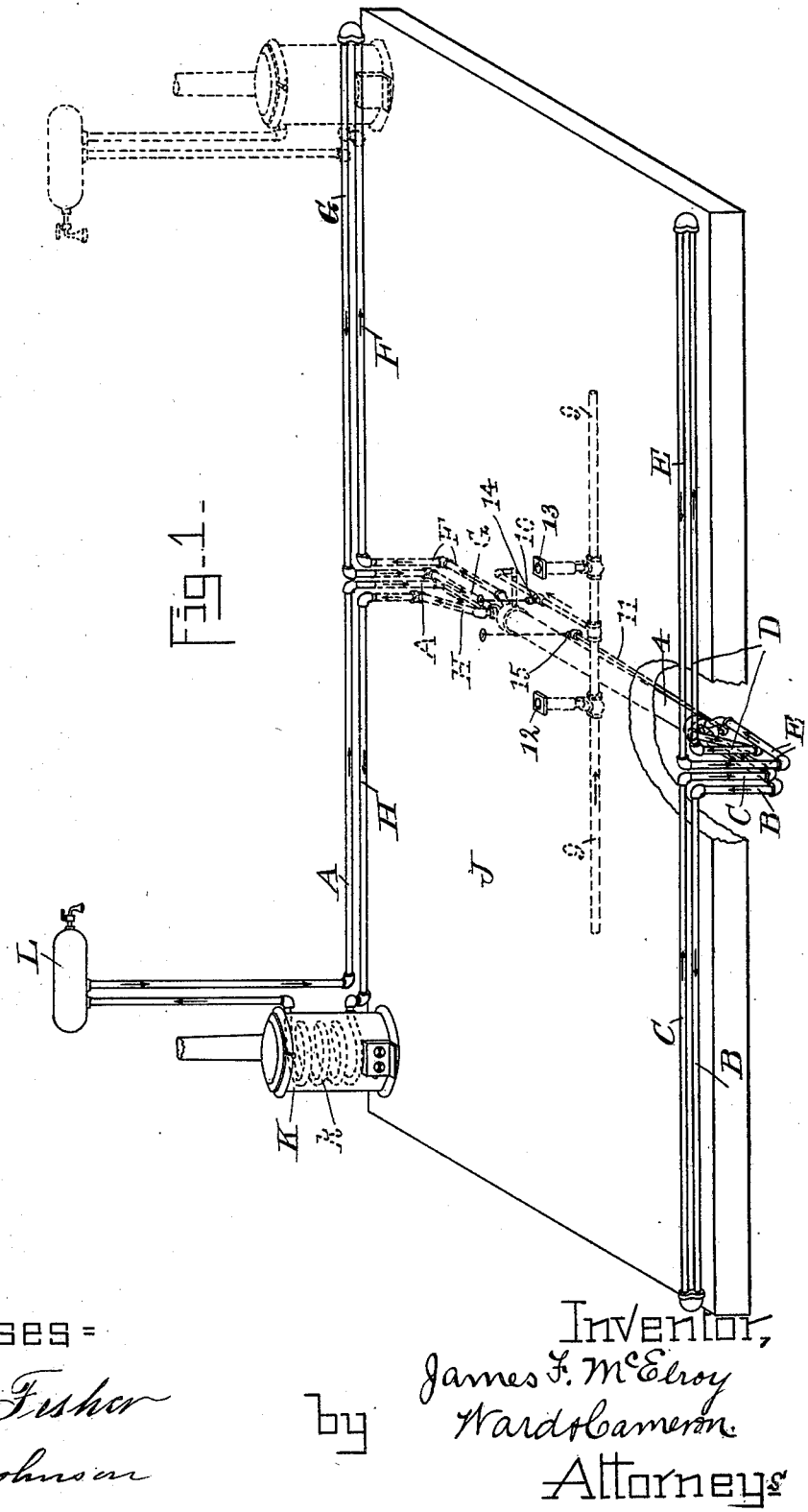
Witnesses:
J. W. Fisher
E. R. Johnson
Inventor,
James F. McElroy
by Ward & Cameron
Attorneys No. 672,509. Patented Apr. 23, 1901.
J. F. McELROY.
HEATING APPARATUS.
(Application filed July 8, 1895.)
(No Model.) 4 Sheets—Sheet 2.
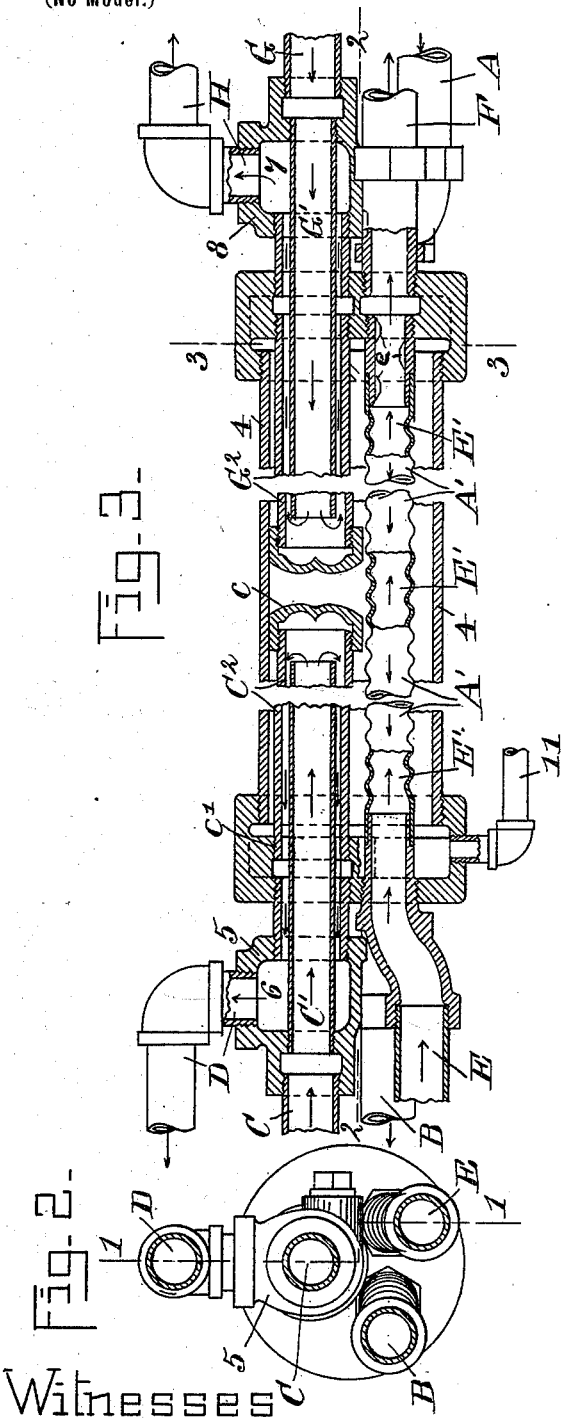
Witnesses
J. W. Fisher
E. R. Johnson
Inventor,
James F. McElroy
by Ward & Cameron.
Attorneys
THE NORRIS PETERS CO., PHOTO-LITHO., WASHINGTON, D. C.

No. 672,509. Patented Apr. 23, 1901.
J. F. McELROY.
HEATING APPARATUS.
(Application filed July 8, 1895.)
(No Model.) 4 Sheets—Sheet 3.

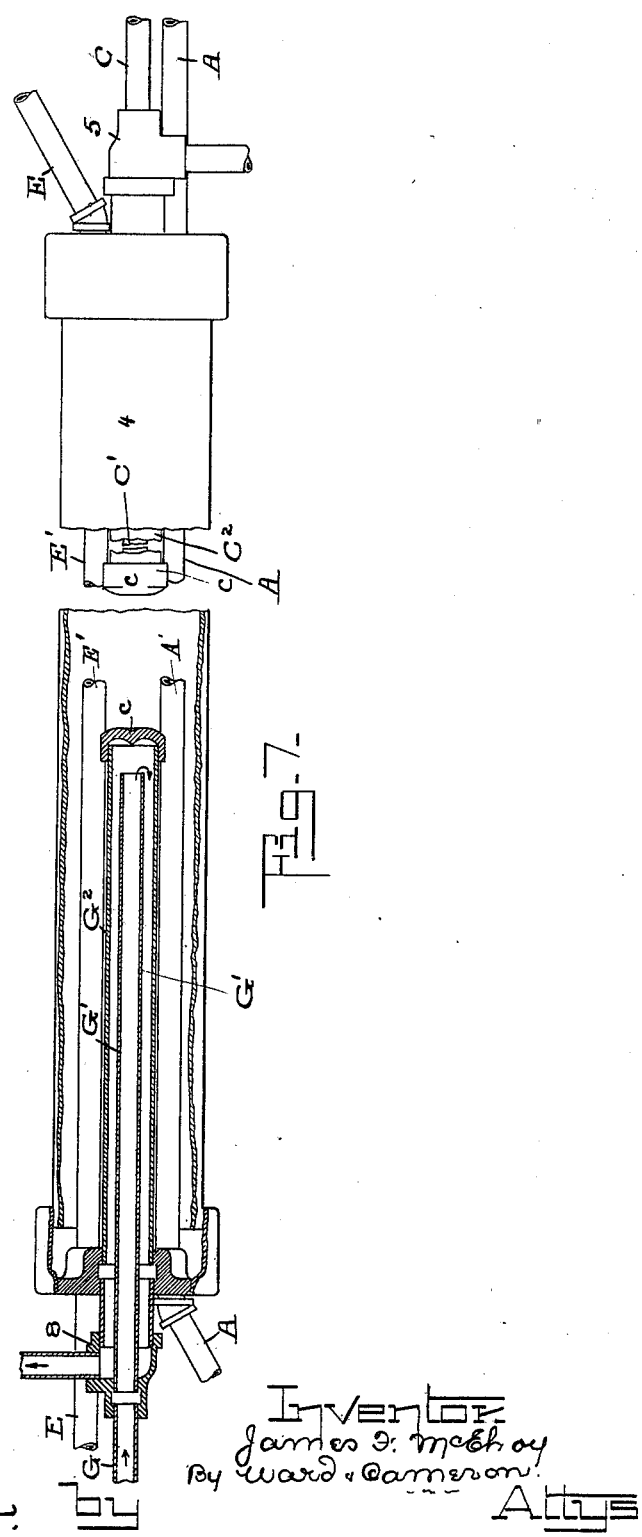

UNITED STATES PATENT OFFICE.

JAMES F. McELROY, OF ALBANY, NEW YORK, ASSIGNOR TO CONSOLIDATED CAR-HEATING COMPANY, OF SAME PLACE.

HEATING APPARATUS.

SPECIFICATION forming part of Letters Patent No. 672,509, dated April 23, 1901.

Application filed July 8, 1895. Serial No. 555,234. (No model.)

*To all whom it may concern:*

Be it known that I, JAMES F. MCELROY, a citizen of the United States, residing in the city and county of Albany, State of New York, have invented a new and useful Improvement in Heating Apparatus, of which the following is a specification.

My invention relates to improvements in heating apparatus adapted to be used in railway-cars, in which hot water is the medium for conveying the heat, which is or may be supplied from two sources, substantially as shown in my Patent No. 469,864, dated March 1, 1892, which apparatus is so arranged that the circulating system shall be heated at four points substantially equidistant from each other and in such manner that by the time the circulation has moved through one-quarter of the circuit the water contained in the piping is all heated; also, to provide a means for causing the circulation to take place in a predetermined direction. I attain these objects by means of the mechanism illustrated in the accompanying drawings, in which—

Figure 1 is a perspective view of a car-floor with part broken away, showing my system as connected up. Fig. 2 is an end elevation of the drum 4. Fig. 3 is a vertical longitudinal section along the line 1 1 on Fig. 2. Fig. 4 is a horizontal longitudinal section along the lines 2 2 on Fig. 3. Fig. 5 is a cross-section along the line 3 3 on Fig. 3. Fig. 6 is a perspective view of the drum 4, showing the depressions in the pipes containing the circulating medium. Fig. 7 is a horizontal section of the drum 4, partly broken away.

Similar characters refer to similar parts throughout the several views.

I place a drum 4 beneath the car-floor, supported by any appropriate means and supplied with steam by means of the pipes 9 and 10. This drum 4 is capped at each end, and through these caps extend spur-tubes $C^2$ and $G^2$, closed by caps $c$ $c$ at their inner ends. Said spur-tubes are nearly half the length of the drum and are inclosed therein. Through the heads of the drum and inclosed by it are also arranged two crossover-pipes, preferably corrugated, as shown at A' and E'.

Exterior castings 5 and 8 are appropriately threaded and connected to tubes $C^2$ and $G^2$ at their outer ends by means of interior fittings, as shown in Fig. 3. These castings are hollow and afford circumferential spaces around inner tubes C' G', open at the ends, and which extend concentrically within the spur-tubes $C^2$ and $G^2$, being rigidly supported therein by being attached to the castings 5 and 8 in such manner that an open communication is afforded between the communicating pipes G and G' and also C and C'. These pipes C and G are connected with the circulating-pipes, as hereinafter described. Arising from the castings 5 and 8 and communicating with the interior thereof are the elbowed pipes D and H, which also communicate with the circulating system, as hereinafter described, and illustrated by the arrows in Figs. 1 and 3.

In Figs. 2, 3, and 4 are shown the corrugated pipes A' and E', which are also inclosed, as hereinbefore stated, in the drum 4. These pipes have appropriate connections with the circulating system by means of the outside connecting-pipes A, B, E, and F. Thus it will appear there are four connections with the circulating system made by means of the pipes mentioned at either end of the drum, each of which corresponds with one-eighth of the circulating system, or, as they are coupled up in series, two of which, as hereinafter described, correspond with one-fourth of the circulating system. It is also obvious that the coupling might be done in various manners, so as to produce a circulation as shown in Fig. 1 or a circulation reversed from that in Fig. 1.

Within the car J there is placed the heater K, containing the coil $k$, which is connected with the expansion-drum L, all of which is preferably placed in one corner of the car. The water of circulation passes through the pipe A, arranged along one side of the car, one end of which communicates with the expansion-drum L and the other with one of the corrugated crossover-pipes A' within the drum 4. The opposite end of the corrugated pipe A' is connected with the pipe B, which extends upward through the floor of the car, into it, thence along the side of the car to the end opposite that occupied by the heater K, where it is met by the pipe C, which extends substantially parallel with the pipe B along the side of the car to about its center, and thence passes downward and communicates with the pipe C', located within the drum 4. The pipe C' having its interior end open, a communication is afforded with the concentric space within the spur C², and from thence an open communication is afforded, through the casting 5, with the pipe D. This pipe also extends upward through the floor and thence along the side of the car in the opposite direction from that occupied by the pipes B and C and is connected at its farther end with the pipe E, which extends back in a similar manner relatively to D that B does to C, thence to about midway between the ends of the car, passing downward and connecting with the corrugated pipe E' within the drum, the opposite end of the pipe E' being connected with the pipe F, which also extends upward through the floor into the car, and thence along the side of the car substantially parallel to the pipe E upon the opposite side, and is connected at its end with the return-pipe G, which extends back to the center of the car and downward through the floor thereof, and is thence connected with the pipe G', which is similar in its construction and operation to interior pipe C' and is also enveloped by the spur G², the circumferential space around the pipe communicating through the casting 8 with the pipe H, the pipe H entering the car, passing along its side, and is connected with the coil k in the heater K.

As shown in Fig. 1, a variation is made in the connections, so that the circulation is somewhat different; but it would require the heater to be placed in an opposite corner of the car, as shown in dotted lines in that figure, and it is only introduced to show how a variation can be made in the circulation by means of a change in the connections.

It is apparent that the heater in the car may be placed in either corner, and instead of the water of circulation passing into the crossover-pipe and thence to the other side of the car from that from which it started it may be passed into one of the spurs, and thence returned to the same side of the car to be carried to the opposite end, and then be returned back to the center, thence through the crossover-pipe to the opposite side of the car, thence back to the center into the spur, and thence back to the same side of the car, making the return at the opposite end of the car and back to the center, and thence through the other crossover to the opposite side of the car, thence to the opposite end of the car from the heater, thence back to the center of the car into the opposite spur, thence back to the same side of the car, and returned to the coil in the heater.

In order to insure the circulation of the water in the proper direction, I provide depressions in the pipes of circulation adjacent to the drum, as at X Y, which are shown more particularly in Fig. 6. It is a well-known fact that when water is heated steam will be formed in the water of circulation. When the pipes containing the water of circulation are in a horizontal position, there is no more reason for the flow of the water in one direction than in the other. In order to compel the water to flow in the proper direction, I place the depressions in such a manner that the column of water at the side of the depressions shall act upon the steam formed in the pipe to force it out in the opposite direction from that in which the depression is placed in the pipe. In supplying heated steam to the drum it is obvious that the water contained within the spurs or pipes therein and in the crossovers will become heated and therefore expand. After receiving a sufficient amount of heat to overcome the static pressure of the circulating fluid steam will begin to form, and both the heated water and the steam will rise to the highest points. The depressions will create at these points a greater resistance to the flow, and therefore will compel the flow to take place in a proper direction. By forcing out the steam in the direction aforesaid, I mean, the column of water on one side being so arranged that in order to go in the direction not desired, the steam would be obliged to rise against the column of water, which thus offers a resistance too great for the steam to overcome, and thus the steam is driven out in the other direction, where its path is comparatively unobstructed.

The drum being placed beneath a car in a substantially horizontal position, it is apparent that there is very little room for the construction of the pipes in such manner that they can occupy a position materially different from a horizontal position. Therefore these depressions are placed at the end of the drum, as shown in Fig. 6. In this manner the circulation is started in the required direction and is carried throughout the whole system. After the circulation has commenced it will proceed until the water thus forced out of the pipes within the drum returns to it, that from the crossover-pipes returning to the spurs or loops, as the case may be, and that from the spurs or loops returning to the crossover-pipes upon each side, respectively. Thus no portion of the circulating water would be required to make but one-fourth of the circulation around the car before returning to be reheated within the drum 4, it being obvious that by this apparatus the lines of circulation are all bunched together within the drum 4 for that purpose. Thus I am enabled to heat the water of circulation within the car-heating system in about one-quarter of the time that would be required where steam is supplied at one point in the circulation only, inasmuch as I practically furnish it simultaneously at four points. I have also to overcome the inertia and friction to only one-fourth of the pipe instead of the whole or half, as in other systems employing steam-heated drains in the line of hot-water circulation, and should an air-plug form in any one of the pipes the combined action of the four risers in which steam is generated would be brought to bear to drive the air out of the pipes into the expansion-drum. It will be observed that the drum is so peculiarly constructed that no difficulty exists in arranging the pipes A' and E', as the caps on both ends of the drum are made alike, and the pipes A' E' are screwed in their opposite ends, allowing the pipes to be withdrawn at one end. As these pipes are corrugated, they can be contracted or expanded so that no difficulties from contraction or expansion will exist. The threads can be caught at the opposite end of the drum with a suitable fitting e, and the fitting turned at the opposite end, being thus turned so that the two fittings make up together.

It is apparent that it will make no difference in regard to my invention as to whether the heater occupies the position at right angles to or parallel with the axis of the car. It is also evident that many different arrangements of the pipes in detail may be made and still use the same drum to heat the circulating system at four points equally distant from each other, so that by the time the circulation is moved through one-quarter of the circle the pipe is all heated. The crossover-pipes within the drum may be arranged so that the discharge end is higher than the inflow end, if desired, and the manner of connecting the crossover-pipes in the drum so that the pipes can be moved from the drum without taking the drum apart is an important feature. This is done by merely unscrewing the pipes at both ends at the same time and then disconnecting and drawing the pipes out lengthwise.

What I claim as my invention, and desire to secure by Letters Patent, is—

1. In a hot-water car-heating apparatus, the combination of a drum located substantially horizontally, crossover-pipes inclosed therein and extending therethrough, inwardly-projecting spurs composed of two concentric pipes, the outer one of which is closed at its inner end, the inner of said pipes communicating with the circulating system and receiving therefrom an inflow of fluid, the outer of said pipes communicating with an extension of said system and delivering thereto the fluid received from the inner pipe, said extensions of the circulating system communicating with the crossover-pipes through which the circulating fluid must pass in its inward course, and means for supplying steam to said drum for the purpose set forth, substantially as described.

2. In a hot-water car-heating apparatus, the combination of a drum located substantially horizontally, crossover-pipes inclosed therein and extending therethrough, inwardly-projecting spurs composed of two concentric pipes, the outer one of which is closed at its inner end, the inner of said pipes communicating with a circulating system and receiving therefrom an inflow of fluid, the outer of said pipes communicating with an extension of said system and delivering thereto the fluid received from the inner pipe, said extensions of the circulating system communicating with the crossover-pipes through which the circulating fluid must pass in its inward course, means for supplying steam to said drum for the purpose set forth, and means for heating the circulatory medium at some point within the car independent of the drum, substantially as described.

3. In a car-heating apparatus, a drum placed beneath the floor of the car about midway between its ends in a substantially horizontal position, a means for conveying steam to said drum from the train-pipe, pipes extending the length of said drum attached securely at both ends to the drum and adapted to be removed from the drum without taking the drum apart, an inwardly-projecting pipe with a closed inner end secured at each end of said drum, a pipe of smaller diameter enveloped by each of said inwardly-projecting pipes, and pipes of circulation arranged along the sides of the car connected with said pipes in said drum, substantially as described and for the purpose set forth.

4. In a car-heating apparatus, a heater placed within the car adapted to heat the water of circulation, pipes of circulation arranged along the sides of said car, a drum placed beneath the floor of the car in a substantially horizontal position, crossover-pipes placed within said drum, inwardly-projecting pipes with closed inner ends placed at each end of said drum, pipes of smaller diameter placed within each of said inwardly-projecting pipes, said pipes of circulation connected with each of said pipes in such a manner that the circulating system shall be heated at four points equally distant from each other, substantially as described and for the purpose set forth.

5. In a car-heating apparatus, a drum located in a substantially horizontal position placed beneath the floor of the car adapted to be supplied with steam from the locomotive, an inwardly-extending pipe secured to each end of said drum, crossover-pipes with closed inner ends extending through and from said drum, a pipe of smaller diameter placed within each of said inwardly-extending pipes in said drum, a heater placed within the car, pipes of circulation placed on each side of said car connected with pipes in said drum, so arranged that the circulation of water in the car is from the heater down to the center of the car on one side into the pipe enveloped by the inwardly-projecting pipe in said drum, from said inwardly-projecting pipe into the pipe of circulation on the same side of the car, extending to the end of the car opposite that from which it started and back to the center, where it enters one of the crossover-pipes within said drum, passes to the opposite side of the car through one of the pipes of circulation extending to the end of the car opposite that occupied by the heater and back again to one of the pipes enveloped by the inwardly-projecting pipes in said drum, passing out into one of the pipes of circulation extending along the same side of the car to the opposite end thereof and back, passing through one of the crossover-pipes within said drum through the pipe connected to the heater, substantially as described and for the purpose set forth.

6. In a car-heating apparatus, the combination of a closed substantially horizontally placed drum, means for supplying hot steam thereto, a system of water-pipes connected with a circulatory system inclosed in said drum, one half of which extend therethrough, and the other half of which extend within the drum and return upon themselves, substantially as described.

7. In a steam-heating drum located in substantially a horizontal position, the combination of the shell, screw-caps constituting chambers and received pipes, a portion of which extend therethrough, and another portion extend inwardly and return upon themselves, substantially as described.

8. In a steam-heating drum placed in substantially a horizontal position, the combination of the shell, screw-caps received pipes adapted to carry a heating liquid, means whereby an initial-heating liquid is supplied to said drum, trapped depressions in the extension of said pipes contiguous to the ends of the drum adapted to utilize a difference in specific gravity of the inflowing fluid to compel a forward movement thereof, substantially as described and for the purpose set forth.

9. In a steam-heating drum placed in substantially a horizontal position, the combination of a shell, screw-caps received pipes adapted to carry a heating liquid, means whereby an initial-heating liquid is supplied to said drum, depressions in the extensions of said pipes, so arranged that the inflowing liquid will be compelled to move in a predetermined direction when heated in said drum, substantially as described.

10. In a car-heating apparatus, the combination of a closed drum placed in substantially a horizontal position, means for supplying steam thereto, a system of water-pipes connected with the circulatory system and inclosed in said drum, depressions in the water-pipes, all so arranged that the steam generated in the water-pipes will not pass through the depressions, but will escape from the heated portion at the end opposite the depressions, compelling the flow of the water of circulation in that direction, substantially as described.

11. In a car-heating system, a heater within the car adapted to heat the water of circulation, pipes of circulation arranged along the sides of said car, a drum placed beneath the floor of the car, placed in substantially a horizontal position, crossover-pipes placed within said drum, and means for heating the water of circulation in said drum and returning the same to the end of the drum which it entered, depressions in the circulating-pipes near the ends of the drum, all so arranged that the water in the drum shall be heated and returned to the car, the direction of circulation being controlled by the depressions in the pipes, substantially as described.

12. In a car-heating apparatus, a steam-drum placed in substantially a horizontal position, a hot-water-circulating system, with means for regulating the direction of circulation by means of the depressions in the pipes containing the water of circulation, substantially as described.

JAMES F. McELROY.

Witnesses:
H. J. NODINE,
W. P. EDDY.